Feb. 10, 1925.
M. CROWLEY
1,526,121
AUTOMOBILE BRAKE
Filed Nov. 10, 1921
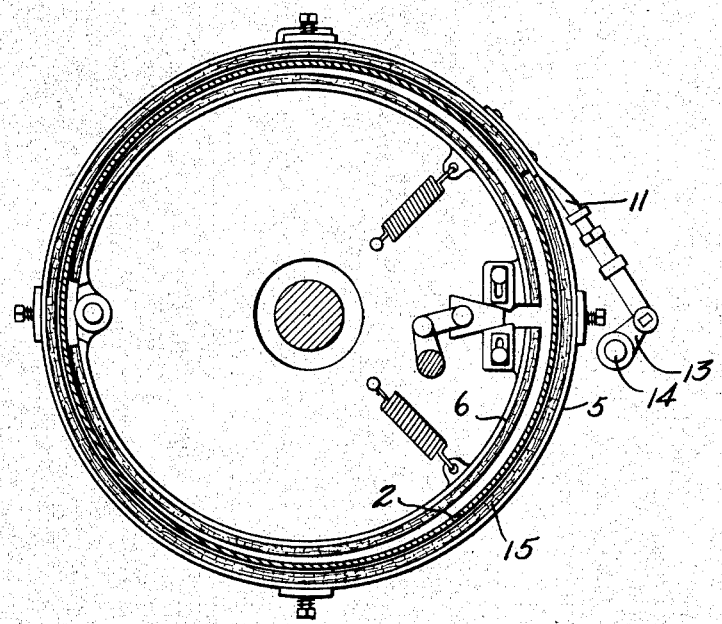
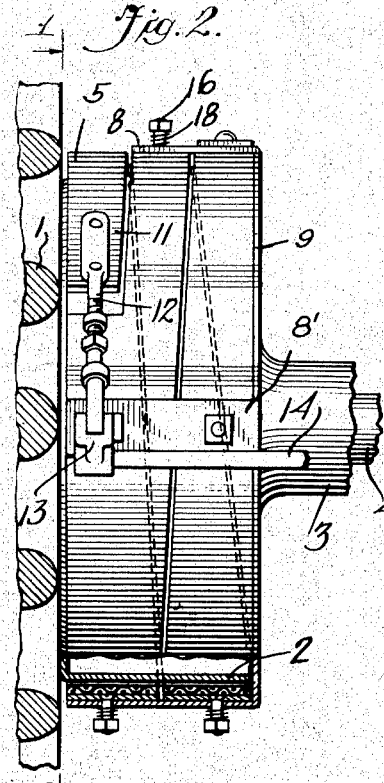
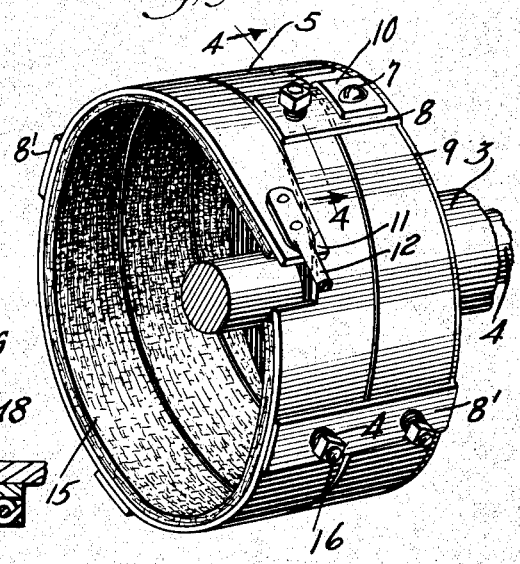
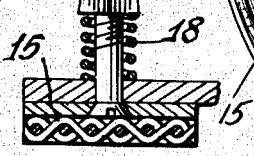
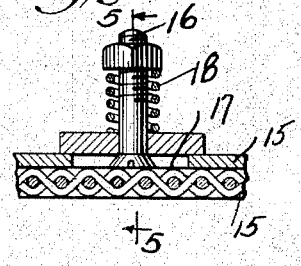
INVENTOR
MICHAEL CROWLEY
ATTORNEYS Patented Feb. 10, 1925.

1,526,121

UNITED STATES PATENT OFFICE.

MICHAEL CROWLEY, OF NEW YORK, N. Y., ASSIGNOR, BY DIRECT AND MESNE ASSIGN-
MENTS, TO COWING BRAKE CORPORATION, OF NEW YORK, N. Y., A CORPORATION
OF NEW YORK.

AUTOMOBILE BRAKE.

Application filed November 10, 1921. Serial No. 514,223.

*To all whom it may concern:*

Be it known that I, MICHAEL CROWLEY, a citizen of the United States, and a resident of the city of New York, borough of Manhattan, in the county and State of New York, have invented a new and Improved Automobile Brake, of which the following is a full, clear, and exact description.

This invention relates to brakes for vehicles and has for an object to provide an improved construction wherein a quick braking action is secured with a maximum braking effect.

Another object in view is to provide a brake for automobiles wherein a brake band having more than one convolution is used.

A still further object of the invention is to provide a brake band having more than one turn associated with a drum and other parts whereby a comparatively small movement will cause all of the coils to frictionally engage the drum for producing a braking action.

In the accompanying drawing—

Figure 1 is a section on line 1—1 of Figure 2, showing a brake embodying the invention, the same being shown applied.

Figure 2 is an edge view of the structure shown in Figure 1.

Figure 3 is a perspective view of the brake shoe shown in Figure 1 with part of a wheel shown in connection therewith.

Figure 4 is a detail fragmentary sectional view through Figure 3 on line 4—4.

Figure 5 is a section taken on line 5—5 of Figure 4.

Referring to the accompanying drawing by numerals 1 indicates a wheel of any desired kind to which a drum 2 is secured. The wheel 1, if desired, may be provided with an axle housing 3 which accommodates the axle 4. The wheel 1, drum 2, axle housing 3 and axle 4 are old and form no part of the invention except in connection with the brake shoe or band 5. If desired, an inner brake shoe 6 could be provided but said structure forms no part of the invention. The brake shoe 5 is connected at 7 to a plate or arm 8 merging into a side plate 9 which may be an integral flange of the axle housing or may be a separate member rigidly secured to the axle housing. The brake shoe 5 at point 7 is provided with a hook end 10 which hooks over the plate 8 and from said hook end the band 5 extends entirely around the drum 2 and passes beneath the outer end of plate 8 and then around the drum a second time so that the end 11 thereof may be arranged as shown in Figure 3.

End 11 carries a pull rod 12 which is connected by threaded members or otherwise to a crank 13 rigidly secured to the shaft 14. The shaft 14 is connected in any usual or preferred manner with the ordinary brake pedal of the automobile whereby when said brake pedal is pressed, shaft 14 will be rotated and rod 12 will be pulled until the various convolutions of the shoe 5 are reduced in diameter and caused to tightly hug or press against the drum 2. This will produce a gripping action that may be sufficiently strong to quickly lock the drum against rotation. A lining 15 is provided for the various convolutions of the brake shoe 5, said lining being of the usual construction of linings now in common use.

At convenient points around the brake shoe are arranged not only plate 8 but similar plates 8' and retaining bolts 16 are provided for holding the various convolutions of the brake shoe in proper place without interfering with their gripping action. As shown in Figure 4 a slot 17 having bevel walls is provided for each of the bolts 16, said bolts also carrying springs 18.

By reason of this construction and arrangement, the various convolutions are pulled away or caused to become released from the drum when the pull on rod 12 is released and at the same time a substantially longitudinal movement of the various parts of the shoe past the respective bolts 16 is permitted.

What I claim is:—

1. The combination with the wheel of a vehicle, and a stationary member adjacent said wheel, of a brake drum connected with said wheel so as to rotate therewith, a single band surrounding said drum formed with a plurality of convolutions, means for securely connecting one end of said band to said stationary member, means for connecting the opposite end of said band to a pull member, and means for holding the various convolutions of said band in aligned relation to each other to produce a proper gripping action when said pull member has been actuated.

2. A brake for automobiles comprising a drum, a plate adapted to be connected with the axle housing of an automobile, a pair of auxiliary arms extending from said plate over said drum but spaced from the drum, a brake shoe having one end secured to one of said arms arranged between said arms and the drum, said brake shoe being formed of a strip of material having a plurality of convolutions, means carried by said arms for normally holding said convolutions out of engagement with said drum, and means for causing said convolutions to grip said drum.

3. An automobile brake comprising a drum, a plurality of arms extending over said drum but spaced therefrom, said arms being stationary in respect to the drum, a brake shoe arranged between said arms and drum, said brake shoe having a plurality of coils, one end of said brake shoe being securely connected with one of said arms, means extending through said arms for holding said brake shoe in proper operative position, and a pull rod connected with one end of the brake shoe for causing the brake shoe to be constricted to grip said drum.

4. An automobile brake, comprising a drum adapted to be connected with the wheel of an automobile, a spirally formed brake shoe surrounding said drum and formed with a plurality of convolutions, means for connecting one end of said spirally formed brake shoe with the axle housing of the automobile, a manually actuated member connected with the opposite end of said brake shoe whereby when the manually actuated member is moved the various convolutions and said brake shoe will be constricted for pinching said drum, and a plurality of fixed guiding arms for each convolution of said brake shoe.

MICHAEL CROWLEY.